(12) United States Patent
Lindner (10) Patent No.: US 11,653,694 B2
(45) Date of Patent: May 23, 2023

(54) METHOD FOR MANUFACTURING MOUTHPIECE LINING PAPER (71) Applicant: TANNPAPIER GMBH, Traun (AT)

(72) Inventor: Michael Lindner, Wartberg ob der Aist (AT)

(73) Assignee: TANNPAPIER GMBH, Traun (AT)

( * ) Notice: Subject to any disclaimer, the term of this patent is extended or adjusted under 35 U.S.C. 154(b) by 283 days.

(21) Appl. No.: 17/195,126

(22) Filed: Mar. 8, 2021

(65) Prior Publication Data

US 2021/0186085 A1 Jun. 24, 2021

Related U.S. Application Data (63) Continuation of application No. 15/301,486, filed as application No. PCT/AT2015/050086 on Apr. 1, 2015, now abandoned.

(30) Foreign Application Priority Data

Apr. 3, 2014 (AT) .............................. A 50252/2014

(51) Int. Cl.
A24C 5/00 (2020.01)
A24C 5/56 (2006.01)
(Continued)

(52) U.S. Cl.
CPC ................ *A24C 5/56* (2013.01); *A24C 5/007* (2013.01); *B23K 26/0846* (2013.01);
(Continued)

(58) Field of Classification Search
CPC ...... A24C 5/007; A24C 5/56; B23K 26/0846; B23K 26/389; B23K 26/402; B23K 2103/40; B26F 1/26
See application file for complete search history.

(56) References Cited

U.S. PATENT DOCUMENTS 3,862,396 A 1/1975 Machida et al.
4,094,324 A 6/1978 Bolsinger et al.
(Continued)

FOREIGN PATENT DOCUMENTS

CN 201350547 Y 11/2009
CN 201801218 U 4/2011
(Continued)

OTHER PUBLICATIONS

Tokida, A.; "The Effect of a Perforated Mouthpiece Tube on Cigarette Smoke Reduction"; 1985; Agriculture, Biology, Chemistry (11), p. 3103-3107 (Year: 1985).*
(Continued)

*Primary Examiner* — Thomas M Wittenschlaeger
*Assistant Examiner* — David G Shutty
(74) *Attorney, Agent, or Firm* — Liang & Hennessey LLP; Brian Hennessey (57) ABSTRACT A method for producing a diffusion-optimized tipping paper for tobacco products, especially filter cigarettes, by plasma perforation of the web of tipping paper for the purpose of maximum carbon monoxide reduction, wherein the diffusivity and the permeability P of the perforated tipping paper are measured in-line and diffusivity is maximized by controlling the perforation parameters, the definable target permeability $P_{soll}$ being maintained at all times.

20 Claims, 4 Drawing Sheets (51) Int. Cl.
*B26F 1/26* (2006.01)
*B23K 26/08* (2014.01)
*B23K 26/382* (2014.01)
*B23K 26/402* (2014.01)
*B23K 103/00* (2006.01)

(52) U.S. Cl.
CPC .......... *B23K 26/389* (2015.10); *B23K 26/402* (2013.01); *B26F 1/26* (2013.01); *B23K 2103/40* (2018.08)

(56) References Cited

U.S. PATENT DOCUMENTS

| | | | |
|---|---|---|---|
| 4,107,606 A | 8/1978 | Typpo et al. | |
| 4,112,154 A | 9/1978 | McCarthy et al. | |
| 4,154,090 A | 5/1979 | Heitmann et al. | |
| 4,177,670 A | 12/1979 | Heitmann et al. | |
| 4,218,606 A | 8/1980 | Whitman, III | |
| 4,219,727 A | 8/1980 | Bolt | |
| 4,236,062 A * | 11/1980 | Lilly, Jr. | A24C 5/007 219/384 |
| 4,240,448 A | 12/1980 | Heitmann et al. | |
| 4,246,775 A | 1/1981 | Stultz | |
| 4,247,754 A | 1/1981 | Baier | |
| 4,253,010 A | 2/1981 | Brown et al. | |
| 4,276,480 A | 6/1981 | Watson | |
| 4,297,559 A | 10/1981 | Whitman, III | |
| 4,323,082 A * | 4/1982 | Helms | A24C 5/007 131/365 |
| 4,403,619 A | 9/1983 | Dahlgrun | |
| 4,407,308 A | 10/1983 | Baker et al. | |
| 4,469,111 A * | 9/1984 | Pinck | B23K 26/06 131/281 |
| 4,501,953 A | 2/1985 | Hollinetz | |
| 4,537,206 A | 8/1985 | Lorenzen et al. | |
| 4,548,677 A * | 10/1985 | Schneider | A24D 1/02 131/365 |
| 4,672,168 A | 6/1987 | Saunders et al. | |
| 5,012,825 A * | 5/1991 | Lindemann | B26F 1/28 131/281 |
| 5,092,350 A | 3/1992 | Arthur et al. | |
| 5,117,087 A | 5/1992 | Baker et al. | |
| 5,210,390 A | 5/1993 | Okumoto | |
| 5,259,401 A * | 11/1993 | Lange | B23K 26/0823 131/281 |
| 5,341,824 A * | 8/1994 | Fletcher | A24C 5/007 131/281 |
| 5,367,144 A | 11/1994 | Matsumura | |
| 5,623,952 A * | 4/1997 | Hausler | A24C 5/007 131/365 |
| 6,025,572 A | 2/2000 | Imai et al. | |
| 6,049,057 A * | 4/2000 | Imai | A24C 5/007 219/121.76 |
| 6,130,402 A | 10/2000 | Abella et al. | |
| 6,281,679 B1 | 8/2001 | King et al. | |
| 7,032,445 B2 | 4/2006 | Belcastro et al. | |
| 7,087,855 B2 * | 8/2006 | Yamaguchi | B23K 10/006 219/121.54 |
| 7,094,193 B2 | 8/2006 | Belcastro et al. | |
| 7,224,447 B2 | 5/2007 | Alexander et al. | |
| 7,310,148 B2 | 12/2007 | Dircksen et al. | |
| 7,375,303 B2 | 5/2008 | Twarog | |
| 7,758,259 B2 | 7/2010 | Noto | |
| 8,760,669 B2 | 6/2014 | Heath et al. | |
| 9,062,964 B1 | 6/2015 | Arabi | |
| 9,073,142 B2 | 7/2015 | Phillip et al. | |
| 9,723,868 B2 | 8/2017 | Griesmayr | |
| 9,981,763 B2 | 5/2018 | Ewert et al. | |
| 10,035,213 B2 | 7/2018 | Shirai et al. | |
| 2005/0035093 A1 | 2/2005 | Yamaguchi et al. | |
| 2005/0087202 A1 * | 4/2005 | Norman | G01N 13/00 131/908 |
| 2007/0039628 A1 | 2/2007 | Aizawa et al. | |
| 2009/0127239 A1 * | 5/2009 | Numata | B23K 26/40 219/121.7 |
| 2011/0231136 A1 * | 9/2011 | Tindall | G01N 7/10 702/100 |
| 2013/0104915 A1 | 5/2013 | Eitzinger | |
| 2013/0306082 A1 | 11/2013 | Sherwood et al. | |
| 2013/0306087 A1 | 11/2013 | Rose et al. | |
| 2013/0306088 A1 | 11/2013 | Rose et al. | |
| 2014/0271952 A1 | 9/2014 | Mua et al. | |
| 2014/0326262 A1 | 11/2014 | Volgger | |
| 2016/0058067 A1 | 3/2016 | Lindner | |
| 2016/0183588 A1 | 6/2016 | Lee | |
| 2016/0185750 A1 | 6/2016 | Dull et al. | |
| 2017/0020184 A1 | 1/2017 | Lindner | |

FOREIGN PATENT DOCUMENTS

| | | |
|---|---|---|
| DE | 2833527 A1 | 2/1979 |
| DE | 2802315 A1 | 7/1979 |
| DE | 3016622 A1 | 11/1981 |
| DE | 3728660 A1 | 3/1989 |
| DE | 4106127 A1 | 9/1992 |
| DE | 4133348 A1 | 4/1993 |
| DE | 19939206 A1 | 2/2001 |
| DE | 69804154 T2 | 11/2002 |
| DE | 10328937 A1 | 1/2005 |
| DE | 102004001327 A1 | 8/2005 |
| DE | 102010013669 A1 | 10/2011 |
| EP | 0038977 A2 | 11/1981 |
| EP | 0056223 A2 | 7/1982 |
| EP | 0594122 A2 | 4/1994 |
| EP | 0909606 A1 | 4/1999 |
| EP | 0995076 A1 | 4/2000 |
| GB | 2437978 A | 11/2007 |
| JP | 07241732 A | 9/1995 |
| JP | 2004148360 A | 5/2004 |
| WO | 2005115181 A1 | 12/2005 |

OTHER PUBLICATIONS

Lindner, M; "Effect and Influence of Perforation Methods for Tipping Paper in the Control of Basic Smoke Yields"; 2012; CORESTA Congress (Year: 2012).*

Austrian Office Action for Application No. AT 50252/2014, Completed by the Austrian Patent Office, dated Feb. 13, 2015, 5 pages.

Lindner M., "Effect and Influence of Perforation Methods for Tipping Paper on the Control of Basic Smoke Yields", 2012, Coresta Congress, Sapporo, Smoke Science/Product Technology Groups.

Notification of Reasons for Refusal from the Japanese Patent Office dated Feb. 1, 2019, in corresponding Japanese Patent Application No. 2016-559644 and English Language translation thereof (7 pages).

Japan Search Report dated Jan. 23, 2019, in corresponding Japanese Patent Application No. 2016-559644 English Language translation only) (14 pages).

Colombian Office Action for NC2016/0003375, English Machine Translation attached to original, dated Feb. 21, 2018, All together 35 Pages.

Chinese Search Report for Chinese Application No. CN2015800170202, dated Sep. 26, 2017, 2 pages.

International Search Report for PCT/AT2015/050086, English translation attached to original, Both completed by the European Patent Office dated Sep. 14, 2015, All together 7 pages.

* cited by examiner

METHOD FOR MANUFACTURING MOUTHPIECE LINING PAPER

CROSS-REFERENCE TO RELATED APPLICATIONS

The present application is a continuation of U.S. patent application Ser. No. 15/301,486, filed Oct. 18, 2016, entitled "DIFFUSION-OPTIMIZED TIPPING PAPER", which is a national phase application of PCT Application No. PCT/AT2015/050086, filed Apr. 1, 2015, which claims the benefit of Austrian Patent Application No. A 50252/2014, filed Apr. 3, 2014, each of which is incorporated by reference in its entirety.

BACKGROUND OF THE INVENTION

1. Field of the Invention

The invention relates to a regulating method for the perforation of mouthpiece lining papers, for achieving maximum reduction of carbon monoxide, and a mouthpiece lining paper manufactured according to this method.

2. Description of the Related Art

The reduction in the CO concentration during smoking a cigarette takes place on the one hand by the so-called dilution of the smoke which take place by the introduction of air into the interior of the cigarette through the end of the tobacco strand, pores in the cigarette paper and the wrapping paper or additionally by holes which have been established by perforating, respectively, and on the other hand by diffusion of the carbon monoxide through the pores or the holes which have been established by perforating, respectively, from the interior of the cigarette to the outside. Diffusion of the carbon monoxide thus takes place through the same pores and holes as the introduction of air, but in the opposite direction. Diffusion of the carbon monoxide towards the outside may also be considered to be a gas exchange, since in this process gases such as oxygen, nitrogen, etc. are diffused into the interior of the cigarette. The dilution of the smoke by means of the introduction of air is often also referred to as ventilation, a distinction being made between filter ventilation and tobacco-strand ventilation, depending on through which part of the cigarette the air makes its way into the interior of the cigarette.

The drag resistance of the cigarette is relevant for the extent of dilution. Said drag resistance determines how high the volumetric flow is of fresh air which is sucked in through the pores and holes of the cigarette when smoking. The ratio of the volumetric flow of fresh air through the pores and holes of the individual parts of the cigarette to the total volumetric flow through the mouth end of the cigarette is referred to as the degree of ventilation, there also being a distinction here between a degree of filter ventilation and a degree of tobacco-strand ventilation.

It is desirable in finished cigarettes that they have uniform dilution or drag resistance or a uniform degree of ventilation, respectively, since the degree of ventilation can substantially influence and modify the flavour of the cigarette.

The degree of ventilation is derived depending on the permeability of the cigarette paper and of the mouthpiece lining paper. Therefore, it is necessary for the permeability of both the cigarette paper and of the mouthpiece lining paper to be kept constant during manufacturing.

In order to be able to set a constant permeability which is independent of the properties such as porosity (ratio of cavity volume to total volume) of the used base paper, the base paper for the mouthpiece lining paper is provided with an additional, adjustable perforation.

Apart from the tobacco strand and the filter, a common filter cigarette or even a conventional cigarette tube is composed of the cigarette paper wrapping the tobacco strand, the highly porous filter wrapping paper, and the mouthpiece lining paper. A highly porous filter paper is required when offline or pre-perforated mouthpiece lining paper is used.

The mouthpiece lining paper, often also referred to as "tipping paper" or "tipping", for short, enshrouds the filter and the filter wrapping paper. This is that part of the filter cigarette which is contacted by the lips of the person smoking the cigarette while the filter cigarette is being smoked. Typically, the tipping paper also slightly protrudes in the longitudinal direction of the filter cigarette into the longitudinal region of the tobacco strands, there wraps itself around the cigarette paper and is connected thereto by an adhesive connection. On account of this adhesive connection being established, the filter part and the tobacco-strand part are mechanically interconnected in the cigarette-making machine. The tipping paper most often is indeed a paper, but may also be a film or a foil, for example. In the event of the tipping paper being configured as a film or a foil, the former may be composed of cellophane. The mouthpiece lining paper usually has a visually appealing printed design. This printed design often resembles cork.

At the tobacco-strand end the mouthpiece lining paper is usually configured so as to be partially perforated such that during drawing on the cigarette, air from the environment makes its way into the filter and there is mixed with the smoke stream coming out of the tobacco strand, reducing the smoke values.

Typically, the mouthpiece lining paper is perforated after printing in order to prevent the perforation holes being closed again by the printing operation.

Since the filter wrapping paper which lies below the mouthpiece lining paper is implemented so as to be highly porous, the total or residual permeability of the cigarette in the region of the filter is limited by way of the porosity of the mouthpiece lining paper. The porosity of the mouthpiece lining paper may be obtained by way of the hole size or the hole count produced by perforating, respectively.

Thus, if the remaining cigarette parameters (porosity of the cigarette paper, of the filter wrapping paper, drag resistance of the tobacco strand and of the filter etc.) as well as a pre-defined target value for the degree of ventilation or the smoke values of the cigarette, respectively, are known, a nominal value for the permeability of the mouthpiece lining paper may be pre-defined. The target values for the degree of ventilation and of the smoke values are usually pre-defined by the cigarette manufacturer, so that the nominal value for the permeability can subsequently be established by the mouthpiece lining paper manufacturer and be referred to during the production of the mouthpiece lining paper.

There are methods in the prior art which serve for regulating the permeability of the mouthpiece lining paper to the pre-defined nominal value by way of perforating.

EP 0056223 A2 shows a method for regulating an electrical perforating installation in which the permeability of the paper web is determined by way of the proportion of an electromagnetic wave passing through and being reflected (visible light, for example) which is directed onto the perforated paper web. The deviation of the actual value from the nominal value of permeability is used for regulating the spark energy.

DE 3016622 A1 shows a method for regulating an electrical perforating installation in which the permeability of the paper web is measured. The measured value thus obtained is used for regulating the hole size or the hole count of the perforation by way of the frequency and the duration of the discharges and/or the web speeds.

DE 2833527 A1 shows a method for regulating an electrical perforating installation in which the permeability of the paper web is measured. The measured value thus obtained is used for regulating the hole size of the perforation by way of the frequency of the discharges. This may take place in that in the case of a sufficiently high frequency a plurality of discharges are performed so as to be mutually successive through the same perforation hole and in that the latter is thus somewhat widened with each discharge. It is provided that compressed air for cooling the electrodes is blown in the direction of the ends of the latter.

DE 2802315 A1 shows a method for controlling an electrical perforating installation in which the porosity of the paper web is measured in a testing device. The measured value thus obtained is used for controlling the hole size of the perforation by way of the frequency of the discharges or by switching off individual electrode pairs in order to control the perforation-hole count in this manner.

In the perforating installations and the regulating methods of the prior art the effect of the perforation on the diffusion of carbon monoxide has not been considered to date. The reason therefor may lie in that there has been a predominant opinion to date that the diffusion of carbon monoxide is not influenced by the perforation, or that said diffusion of carbon monoxide cannot be influenced by way of the perforation, in the event that a constant permeability is to be obtained.

Since the reduction of carbon monoxide constitutes a substantial health aspect, it has been a concern of the applicant to research the effect of the perforation on the diffusion of carbon monoxide and to develop a diffusion-optimized mouthpiece lining paper.

SUMMARY OF THE INVENTION

The object underlying the invention is to provide an improved method for perforating the mouthpiece lining paper, wherein the reduction of carbon monoxide in the smoke is to be maximized at constant permeability of the mouthpiece lining paper.

In order to achieve the object it is proposed that perforating the mouthpiece lining paper which is available as a continuous paper web or film web is performed in a regulated perforating device, wherein diffusivity and permeability of the perforated mouthpiece lining paper are determined inline, that is to say directly on the perforating machine, and diffusivity is maximized by regulating the perforation parameters while constantly adhering to the pre-definable permeability.

One possibility consists in measuring the hole size of the holes of the mouthpiece lining paper produced by perforating and to control the perforation parameters such that the hole size for maximum diffusion of the carbon monoxide is established. The permeability of the mouthpiece lining paper is kept constant in that the perforation-hole count is obtained or controlled, respectively, depending on the hole size obtained.

On account of this two-step regulating method it is achieved that diffusion of carbon monoxide through the perforation is maximized and permeability is kept constant.

As will be explained also in theory in the following, the applicant has determined that the diffusion of carbon monoxide is at its maximum when the hole diameter of the individual perforation holes is minimal. Since, for technical reasons, the hole diameter cannot be implemented so as to be arbitrarily small, the method according to the invention consists in regulating the hole diameter to the minimum hole diameter achievable depending on the application and in adapting the number of perforation holes thereto in order to achieve the required permeability. In comparison with the prior art it is advantageous that maximum reduction of carbon monoxide is achieved while adhering to the specifications for permeability. The concentration of the undesirable carbon monoxide is thus reduced as far as possible without influencing the flavour and the drag resistance of the cigarette.

The regulating method according to the invention is best implemented using the method of plasma perforation which has been developed by the applicant. On the one hand, plasma perforation makes extremely small hole diameters possible in the first place, and on the other hand plasma perforation allows very specific and fast regulating of the perforation parameters.

BRIEF DESCRIPTION OF THE DRAWINGS

The invention is visualized by way of drawings in which.

DETAILED DESCRIPTION

First, the physical approach in theory will be explained, without the intention of being bound to the theory.

The reduction of carbon monoxide takes place by diluting the smoke stream and by diffusion. The reduction of carbon monoxide by diluting the smoke stream is determined by the permeability P of the cigarette; consequently, in the case of a pre-defined, constant permeability P, maximizing the CO reduction has to take place by way of maximizing diffusion.

Prior to showing the solution by way of a mathematical approach, the possibility for maximizing diffusivity at constant permeability P will be described by way of the physical correlations. In this document permeability is understood as being the penetrability of the mouthpiece lining paper on account of a pressure differential. The pressure differential is generated by drag on the cigarette. In rough terms, permeability here is a measure of how much fresh air is drawn into the interior of the cigarette through the perforation of the mouthpiece lining paper. The smaller the perforation holes at a constant hole density or number, respectively, the larger the drag resistance caused thereby; therefore, the smaller the holes, the lower the permeability. Hole density is understood as the hole count per area unit.

In this document diffusivity is understood as being the penetrability of the mouthpiece lining paper on account of a difference in concentration. Here, the concentration of carbon monoxide during smoking is higher in the cigarette than in the ambient air. The diffusion of carbon monoxide thus takes place counter to the direction of the influx of fresh air, from the inside to the outside. The level of diffusion, apart from the difference in concentration, is dependent on the area A which is available for diffusion.

Here, many small holes having the same permeability P as a few large holes in total have a larger area A than the few large holes. Thus, diffusion may be maximized by way of perforating as many holes as possible which are as small as possible while keeping the permeability P constant.

The permeability P of the mouthpiece lining paper may be modified by way of the perforation parameters of hole size and hole count. Here, the permeability P may be approximated by using the formula:

$$P = \frac{\pi}{8\eta} \frac{nr^4}{d\Delta p^{v-1}}$$

Here, $\eta$ describes the dynamic viscosity of air. n is the hole count. r is the hole radius. d is the thickness of the paper. $\Delta p$ is the pressure differential between the outer side and the inner side of the paper, and v is an empirically determined permeability exponent which depends on the perforating method.

The diffusion rate of carbon monoxide from the cigarette is derived in an approximate manner as the product of the coefficient of diffusion of carbon monoxide in air and of the area A which is available for diffusion. For the present observation it suffices to state that the diffusion rate increases the larger the area A which is available for diffusion. This area A is derived from the area of a hole $r^2\pi$ multiplied with the hole count n:

$$A = m^2\pi$$

Figure 1:
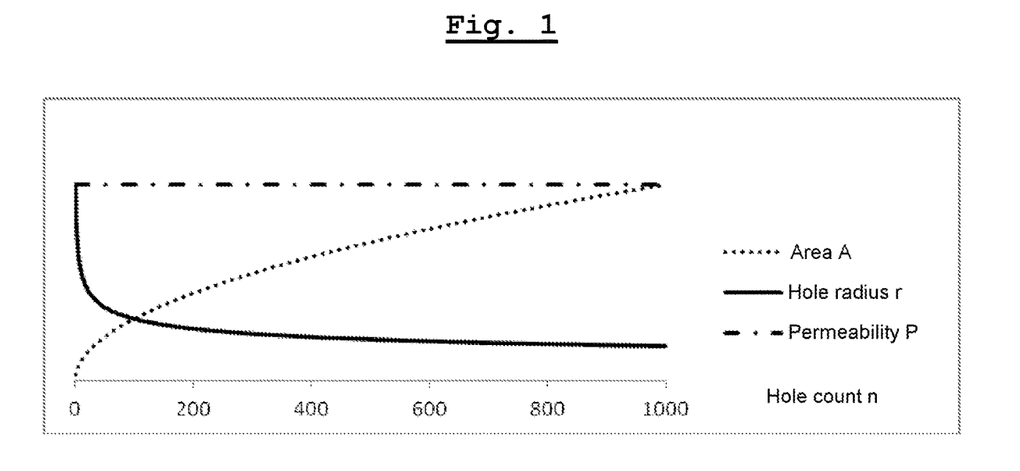
FIG. 1 shows the theoretical correlation between the hole radius r of the perforation and the area A which is available for diffusion, depending on the hole count N at constant permeability P.

In the case of a constant permeability P the ratio of the hole count n to the hole radius r is to be selected such that the sum of the hole areas is maximized. The correlation of permeability P, hole radius r, hole count n, and diffusion area A is shown in FIG. 1. In the case of a constant value of the permeability P, the radius r of the holes steadily decreases as the hole count n increases. Conversely, the diffusion area A (=$r^2\pi n$) increases as the hole count n increases and the hole radius r decreases. In order to maximize the diffusion of carbon monoxide through the mouthpiece lining paper, it is thus necessary to maximize the hole count or to minimize the hole size, respectively.

The limiting factor in this context is the hole size, since the latter, depending on the perforation method and type of mouthpiece lining paper employed for technical reasons cannot be implemented so as to be of an arbitrarily small size. However, it is possible to control the perforation parameters such that the achievable minimum hole diameter $D_{min}$ is obtained.

Since this achievable minimum hole diameter $D_{min}$ depends on many parameters (paper thickness d, coating and type of paper, air humidity, air pressure, deviations in the output of the energy source etc.), it is provided according to the invention that the hole diameter D is measured inline by optical means and the measured values are used for regulating the perforation parameters (output of the energy source; duration of the energy pulse; spacing of the energy source from the paper web; type, volume, and pressure of the gas supply; speed of the paper web etc.).

The perforation-hole count is adapted to the achievable minimum hole diameter $D_{min}$. This may take place by way of calculation or by optical measurement of the permeability P of the perforated paper web.

By way of calculation the hole count n results from:

$$n = \frac{8\eta}{\pi} \frac{P_{soll} d\Delta p^{v-1}}{r^4}$$

The nominal permeability $P_{soll}$ may be indirectly stated by way of the degree of ventilation or by way of the smoke values of the cigarette manufacturer, respectively. $\eta$, $\Delta p$ and v are constant, or depend on the perforating process used, respectively. The required hole count n may thus be calculated when the paper thickness d and the hole radius r, or the hole diameter D (D=2r) are measured, respectively.

Preferably, the permeability P of the perforated paper is measured in an additional second control loop and the hole count n is correspondingly controlled so as to keep the permeability P to the nominal value.

The implementation having two independent control loops is possible if and when the perforation parameters for regulating the hole size have no influence on the hole count n and conversely the hole count n has no influence on the hole diameter D.

In many perforating heads the hole count n may be obtained, for example, in that no energy impulse is applied to individual perforating heads. In the case of a single perforating head the hole count n may be obtained in a controlled manner by way of the number or the frequency of the energy impulses, respectively.

Figure 2:
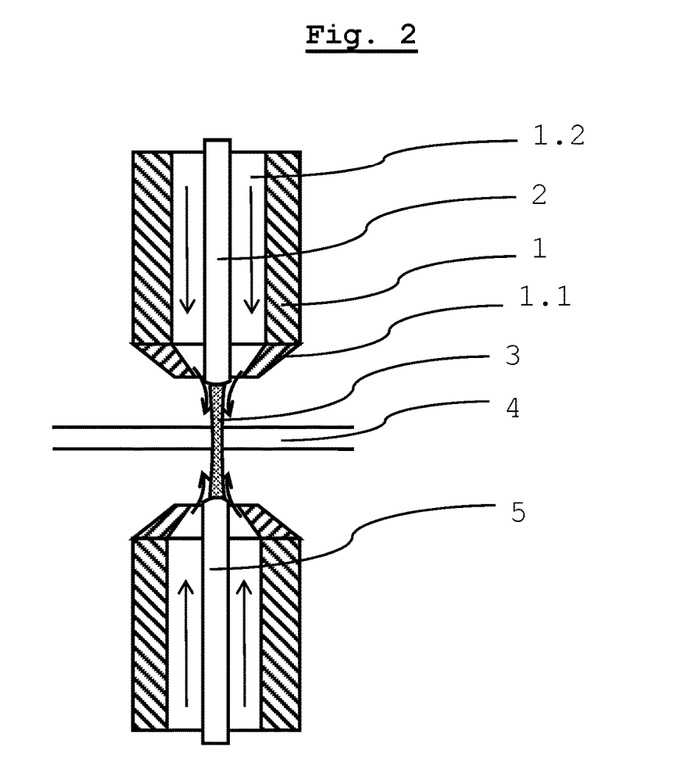
FIG. 2 shows the design of an exemplary plasma perforation head in a sectional view.

A plasma perforating head for plasma-perforating a paper web, in particular a mouthpiece lining paper web or a mouthpiece lining paper 4 is illustrated in FIG. 2. An energy source which is as small as possible in terms of area is disposed on at least one planar side of the mouthpiece lining paper 4. In this example a needle-shaped electrode 2 or more specifically, the brief application of high voltage (AC voltage or DC voltage) between two electrodes 2, 5, is used as an energy source. Perforating may take place in a normal atmosphere, or in a special gas atmosphere, such as a protective gas atmosphere or an atmosphere having a definable gas composition. Here, the atmosphere may have normal pressure or a pressure which is higher or lower in relation to the environmental pressure (air pressure).

Preferably, the gas composition may be modified directly at the location of the plasma, independently of the environmental atmosphere.

Figure 3:
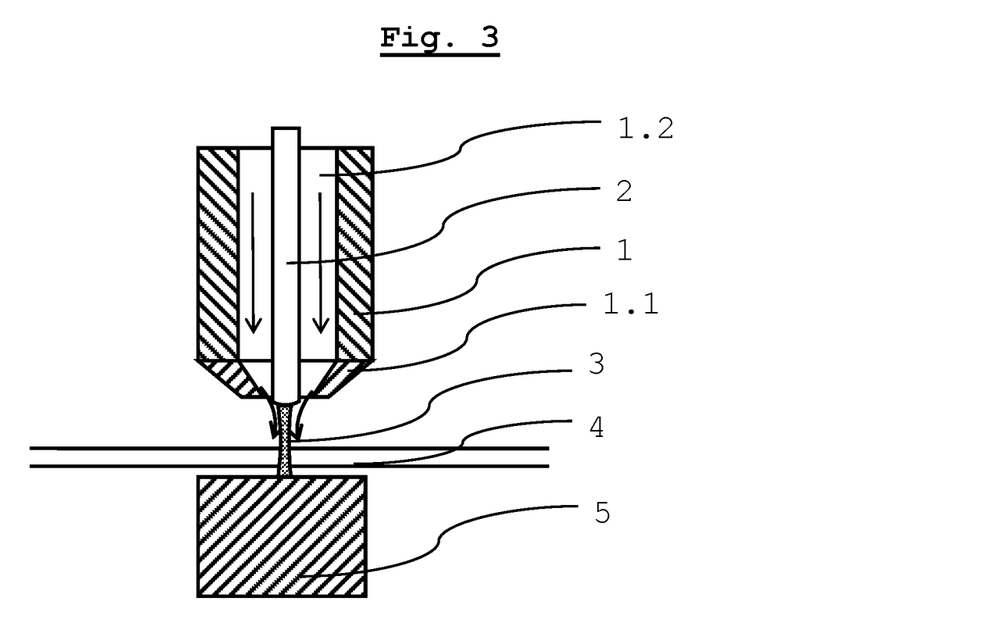
FIG. 3 shows the design of a further exemplary plasma perforation head in a sectional view.

To this end the electrode 2 preferably is attached in a pipe 1. The pipe 1 serves for conveying a pressurized gas or gas mixture. For improved clarity the gas flow in the figures is visualized using arrows. A nozzle 1.1 is located at the front end of the pipe 1. This nozzle 1.1 is attached so as to be concentric around the electrode 2, in the region of the tip of the latter which faces the mouthpiece lining paper 4. A pressurized gas or gas mixture is thus introduced in an annular manner around the electrode 2 in the direction of the mouthpiece lining paper 4 through the cavity 1.2 which is enclosed by the pipe 1 and the nozzle 1.1. A needle-shaped counter electrode 5 which is implemented in a likewise manner, or a planar counter electrode 5 as shown in FIG. 3, may be located on the other side of the tipping paper 4.

By introducing an inert gas or a gas mixture having a high concentration of inert gas through the cavity 1.2, a narrow region having another gas composition remains in the centre of this gas flow, that is to say directly in front of the tip of the electrode 2, towards the mouthpiece lining paper 4. The concentration of inert gas in this region is somewhat lower than in the direct flow from the nozzle 1.1. On account thereof, it is more easily possible for the gas to be ionized in this region and to thus produce a localized plasma 3 which by way of sublimation ultimately produces a hole in the mouthpiece lining paper 4. Since there already is a high concentration of inert gas in and, above all, around the plasma 3, oxidation on the surface of the mouthpiece lining paper 4 is precluded, on account of which visible burn marks on the periphery of the hole are avoided. The expansion of the region having a low concentration of inert gas, and thus of the plasma 3, may be enlarged or reduced by way of a tight or somewhat wider design of the nozzle 1.1, or by modifying the distance by which the electrode 2 protrudes from the nozzle 1.1.

Apart from the frequency, duration, and amplitude of the voltage impulses between the electrodes 2, 5, preferably at least one of the following parameters is controllable in the regulating method according to the invention:
the opening diameter of the nozzle;
the spacing between the nozzle and the electrode tip;
the spacing of the electrode from the paper web;
the web speed;
the gas pressure;
the gas composition;
the flow volume of the gas.

In the case of the usual arrangement of a multiplicity of needle electrodes 2, preferably the opening diameter of the nozzle and/or the spacing between the nozzle and the electrode tip may be controlled, since these modifications take place directly at the effective location of the plasma and thus have a temporally very immediate effect on perforating.

Moreover, these two parameters may be obtained individually on each electrode 2, independently of the other electrode 2, on account of which each individual electrode 2 can be controlled to the minimum hole diameter $D_{min}$ in which is achievable therefor.

Figure 4:
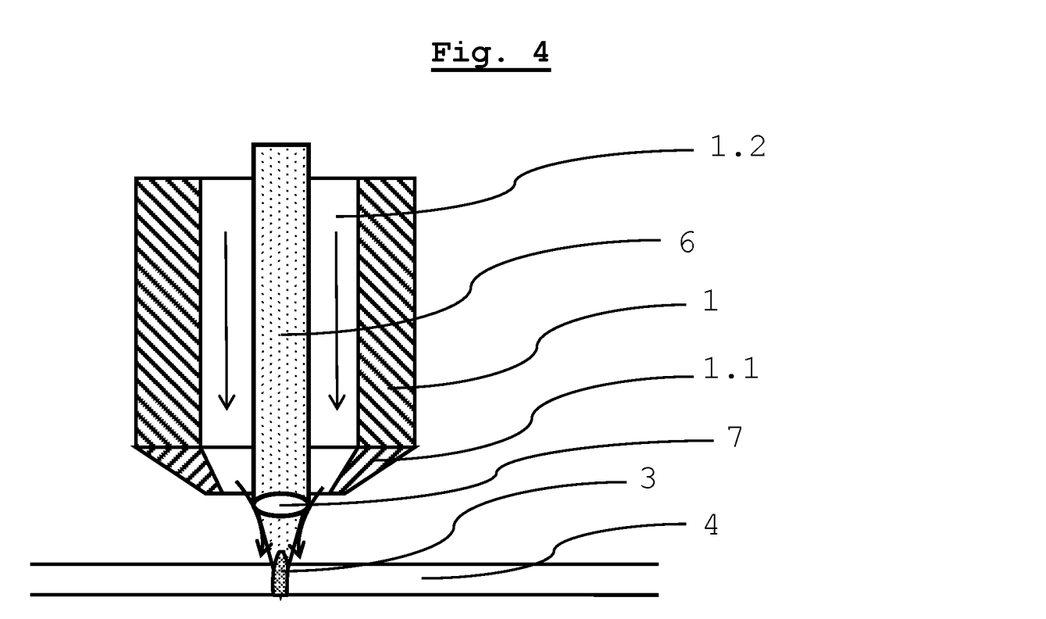
FIG. 4 shows the design of a further exemplary plasma perforation head in a sectional view, having a laser as an energy source.

FIG. 4 shows a preferred perforating head according to the invention, having a laser beam 6 as an energy source. Perforating may take place in a normal atmosphere such as a special gas atmosphere, such as a protective gas atmosphere or an atmosphere having a definable gas composition. Here, the atmosphere may have normal pressure or a pressure which is higher or lower in relation to the environmental pressure (air pressure).

Preferably, the gas composition may be modified directly at the location of the plasma, independently of the environmental atmosphere.

To this end, again a nozzle 1.1 is disposed at the lower end of the pipe 1. A lens 7 which handles two tasks is located so as to be centric in this nozzle 1.1. The lens 7 firstly serves for focusing the laser beam 6 onto the surface of the mouthpiece lining paper 4. Secondly, the lens 7 serves for influencing the gas flow out of the nozzle 1.1 in the desired manner, specifically in such a manner that the gas flow takes places so as to be annular around the lens 7. In order for the inert gas or gas mixture to be able to flow out spherically around the lens 7, the latter is fixed in the pipe 1 by way of thin wires, for example, or is located at the end of a rigid optical wave guide which, like the electrode 2, runs perpendicularly in the pipe 1. In this case, the plasma 3 is limited to that region in which the energy density of the laser beam 6 is sufficiently high in order for the gas mixture to be ionized with a sufficiently low concentration of inert gas. The energy density of the laser beam 6 is at its maximum in the focal point of the lens 7, and the concentration of inert gas is at its lowest there, such that a local, small-area plasma 3 can be produced.

Apart from the output, focal length, frequency, duration and geometry of the laser pulses, preferably one of the following parameters is controllable in the regulating method according to the invention:
the opening diameter of the nozzle;
the spacing between the nozzle and the lens, or the light guide tip;
the web speed;
the gas pressure;
the gas composition;
the flow volume of the gas.

Nitrogen ($N_2$), argon (Ar), helium (He), neon (Ne), or carbon dioxide ($CO_2$) may be employed as an inert gas. It is also possible for individual types of inert gas to be combined with one another using specific mixing ratios or to be combined by flowing through the nozzles into the treatment space. Since the inert gas or gas mixture exits the nozzle 1.1 under pressure, the density of the gas or of the gas mixture in the annular region spherically around the electrode 2 or the lens 7 is higher than in the region directly in front of the electrode 2 or the lens 7. The denser a gas, the more energy is required for ionizing said gas. Additionally, ions and electrons are flushed away by the gas flow. These two effects also contribute towards the plasma 3 being localized.

Regulating the hole diameter D may thus also take place in the case of plasma perforation if and when compressed air is employed as the gas mixture.

Figure 5:
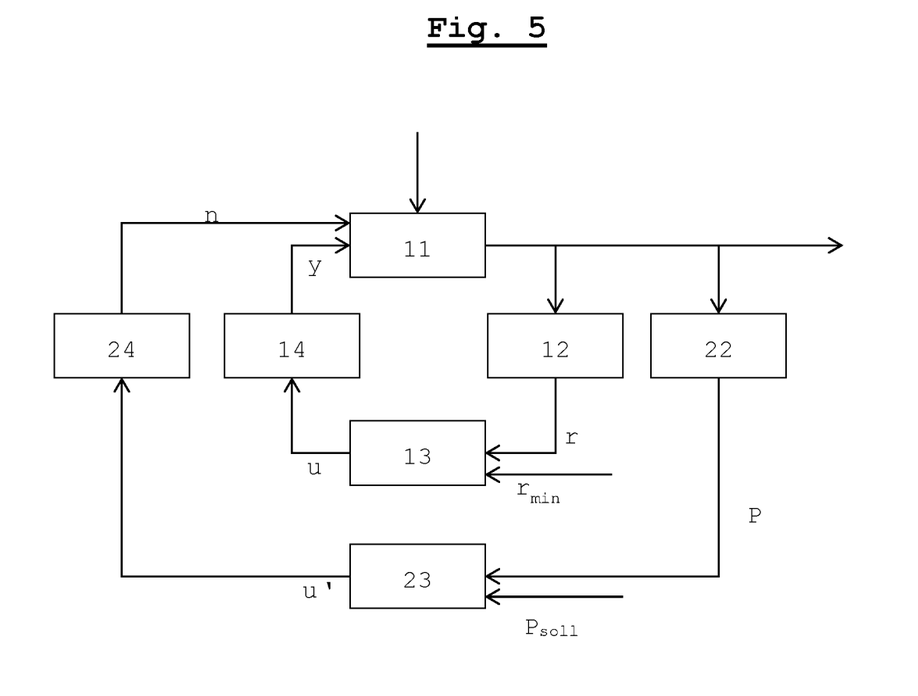
FIG. 5 shows the schematic design of a first variant of regulation, according to the invention.

FIG. 5 schematically shows the first regulation variant according to the invention. Here, the hole size, or the hole diameter D and the hole radius r which can be calculated by way thereof, respectively, is controlled by way of the innermost of the two illustrated control loops, and the hole count n is controlled by way of the outermost control loop.

The hole radius r, or the hole diameter D, respectively, is measured by the measuring device 12. The controller 13 controls the control factor u of the actuating element 14, in order to reduce the hole radius r to the achievable minimum hole radius $r_{min}$. The achievable minimum hole radius limn may be determined in an adjustment phase, for example, in that the hole radius r is reduced by way of a modification of the perforation parameters until the produced plasma is too weak for perforating a hole in the paper at all. The nominal value in the form of the achievable minimum hole radius $r_{min}$ is obtained after adjusting to somewhat above the critical hole radius below which perforating is no longer reliable.

The controller 13 supplies a control factor u which acts on the actuating installation 14. The actuating variable y, such as, for example, the gas pressure, the gas composition, the nozzle diameter, or the spacing of the nozzle from the tip of the energy source may be modified by way of the actuating installation 14. The modification of the actuating variable y causes a modification of the plasma 3 on the paper web 4 (control path 11), which results in a change in the hole radius r.

The measuring device 22 measures the permeability P, preferably by means of electromagnetic waves as shown in EP 0056223 A2. The number n of perforation holes is controlled with controller 23 by the difference between the measured value and the pre-defined nominal value $P_{soll}$. The control factor u' has the effect of switching on or switching off individual perforating heads 24.

For example, the measuring device 12 may be a linear camera (for example a high-resolution CMOS or CCD camera of an optical [laser] micrometer) which is directed onto the paper web and takes images of the perforation rows of the paper web in a manner which is synchronized with the perforating devices, such that the number of perforation holes and the hole diameter D thereof of one perforation row are determinable from analysing the image in a data processing system.

Figure 6:
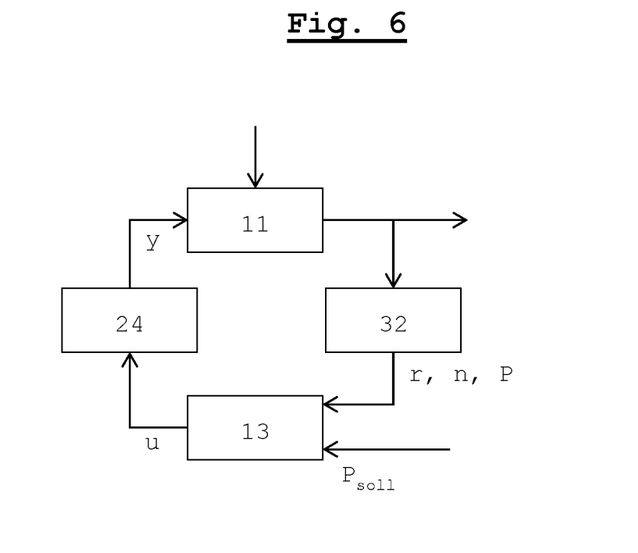
FIG. 6 shows the schematic design of a second variant of regulation, according to the invention.

FIG. 6 shows the control loop of a second variant of the regulation according to the invention. Here, in an adjustment phase, the hole size is initially reduced by modifying selected perforation parameters of perforating heads 24 up to the point until, for example, only 50 to 80% of all energy pulses of the energy source (electrodes 2 or laser beam 6) actually lead to perforation, the ratio of energy impulses which produce a plasma to energy impulses which do not lead to a plasma discharge in the following being referred to as a "discharge rate". Thereafter, preferably other control parameters are used for controlling the energy density in such a way that the required permeability $P_{soll}$ is derived from the resulting discharge rate.

For example, minimizing the hole size in the adjustment phase may be performed in that the gas pressure or gas flow rate is increased, or the gas composition is varied, at constant output of the energy source until a discharge rate of 75% is achieved. Thereafter, these gas parameters are kept constant, and the parameters of the energy source (for example, duration, frequency, amplitude of the energy impulse) are controlled such that the permeability P assumes the pre-defined nominal value by increasing or decreasing the discharge rate.

Should it be encountered that the required permeability $P_{soll}$ is nevertheless undershot at the maximum discharge rate, the hole size has to be somewhat widened at the expense of diffusivity, for example by reducing the gas pressure, reducing the proportion of inert gas in the gas mixture, or adapting the web speed. A measuring device 32 which metrologically acquires the hole count n (or the hole density, respectively), the hole size (hole radius r) and the permeability P is provided for implementing this variant. The data of the measuring device 32 is analysed in a data processing system, and one actuating variable (or a plurality thereof) is/are generated by a controller 13 which may be implemented as software.

Preferably, the data processing system can calculate and store the total area of perforation by multiplying the hole count n with the mean hole size, wherein the total area of perforation may represent a key figure (diffusion area A) for the diffusivity of the paper, or the diffusivity of the paper may be calculated therefrom.

In addition to the hole count n (or hole density, respectively), the hole size (hole radius r), and the permeability P, it is advantageous for the thickness d of the web to be also acquired. Preferably, a non-contacting method for continuously measuring the paper thickness d is employed; such methods are known in the prior art and are shown in the documents U.S. Pat. No. 4,107,606 (A), EP0995076 (A1), U.S. Pat. No. 6,281,679 (B1), for example. The measuring device for measuring the paper thickness d here may be disposed preferably ahead of the perforating device, or else after the perforating device, when viewed in the direction of the web.

Particularly in the case of paper varieties having intensely varying properties (thickness d and permeability P of the base paper, or thickness d of a coating), it may be necessary to perform measuring of permeability, in addition to measuring thickness, ahead of the perforating device. In this case the required number of perforation holes for the perforation which follows in each case may be approximately calculated from the paper parameters and the achievable minimum hole diameter D and may optionally be controlled in that the formula is adapted by way of the measured values of a measuring device, which is disposed after the perforating device, for measuring the actually achieved permeability P. Alternatively, the discharge rate may also be controlled, depending on the thickness d and the permeability P of the base paper.

Figure 7:
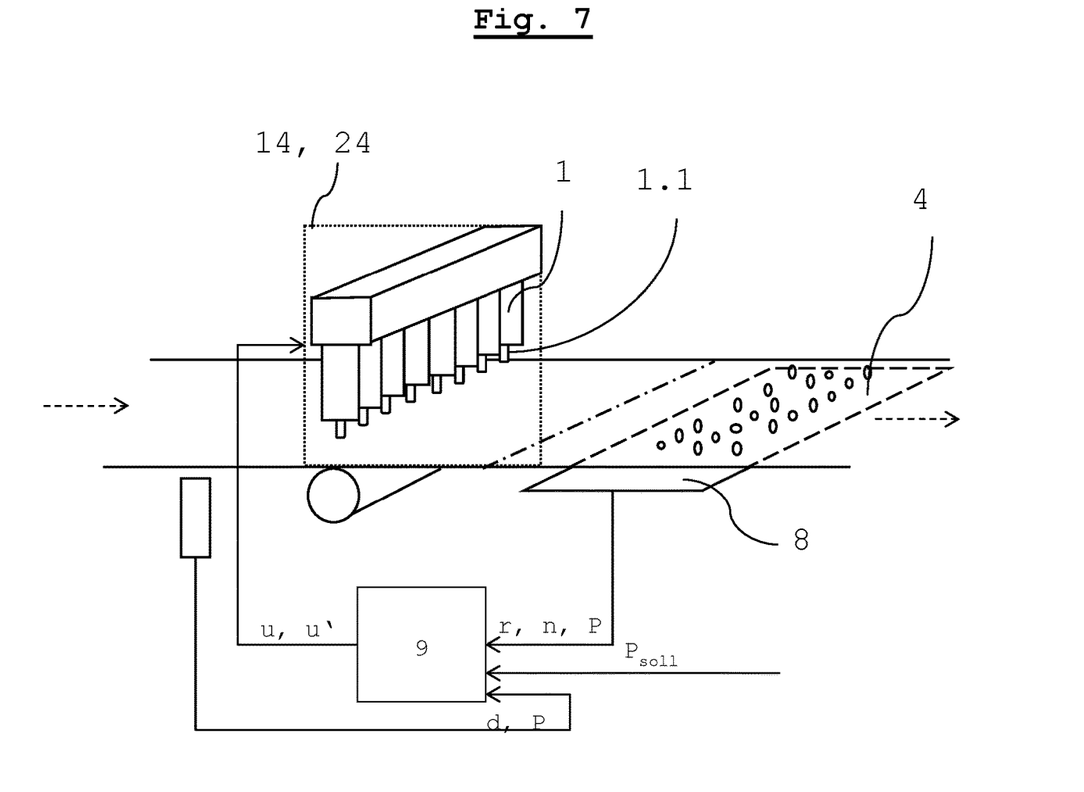
FIG. 7 shows the schematic design of a perforating installation according to the invention, with a schematic illustration of regulation.

In FIG. 7 an exemplary plasma perforating device according to the invention is shown, having a rail with eight perforating heads 24 and a measuring device 8. The number of eight perforating heads 24 here results from reasons of clarity; in the case of a practical implementation the number of perforating heads 24 may be for example between 15 and 30 per rail, wherein a plurality of rails may be disposed so as to be parallel with one another—either behind one another and/or beside one another. The paper web 4 is continuously moved from left to right through the device, optionally at a variable speed. It is also possible for two or more paper webs to be perforated which bear on one another and thus form multiple layers to be simultaneously guided through the perforating device.

Particularly preferably, the measuring devices 12, 22 are configured as one measuring device 8, the signal of which is analysed in a data processing system 9. The data processing system 9 determines the radius r, the hole count n, and the permeability P, and by way of controllers 13, 23 which are implemented as software generates the control factors u, u'. Preferably, the hole radius r or the hole diameter D, respectively, is acquired for each perforating head 24, in order for parameters to be able to be modified in a targeted manner on individual perforating heads 24, or in order to be able to react in the event that individual perforating heads 24 produce significantly larger perforation holes than others, for example on account of wear.

Instead of the nominal permeability $P_{soll}$ (in CORESTA units CU), the degree of ventilation, drag resistance and/or the smoke values to be achieved may also be entered into the data processing system. The nominal permeability $P_{soll}$ may in turn be calculated by way of a calculation rule which is stored in the data processing system.

The hole radius r or the hole diameter D, respectively, the hole count n or the hole density, respectively, and the permeability P serve as input values for the data processing system. The paper thickness d, the permeability P of the base paper, the type and thickness of an optional coating, and the web speed are additional input values. If and when the thickness d and the permeability P of the base paper, or the coating, respectively, are constant across the entire paper web, it is sufficient for these values to be input into the data processing system prior to the commencement of perforating. Above all, if and when the permeability P of the base paper or of the coated paper are negligibly minor in comparison to the permeability P achieved by perforating, the consideration of the permeability P of the base paper may be dispensed with. The hole radius r and the hole count n are metrologically acquired by the measuring device 8 after the perforating device, wherein preferably the permeability P is also acquired by the measuring device 8, or, using the hole count n, the hole radius r, and the thickness d of the paper web, the data processing system can calculate the permeability P according to this formula (or other formulae):

$$P = \frac{\pi}{8\eta} \frac{nr^4}{d\Delta p^{\gamma-1}}$$

The web speed serves as an input value of the data processing system and may also serve as an output value (actuating variable) in the event of the web speed having to be controlled depending on the input values. Further output values (actuating variables) may include: the frequency, duration, and amplitude of the voltage impulses between the electrodes 2, 5; the spacing of the electrode from the paper web; the spacing of the nozzle from the electrode tip; the output, focal length, frequency, duration, and geometry of the laser impulse; the spacing between the nozzle and the lens or the tip of the light guide; the gas pressure; the opening diameter of the nozzle; the gas composition; the flow rate of the gas.

In contrast to the prior art the present invention is advantageous since the influence of the perforation on the reduction of carbon monoxide by diffusion is considered, so that for the first time a diffusion-optimized perforation of mouthpiece lining paper is carried out and thus for the first time a diffusion-optimized perforated mouthpiece lining paper is manufactured.

Moreover the method for plasma perforating is particularly advantageous in this context, since besides the classic controllable parameters of a perforating device (output, duration, frequency of the energy impulses of the energy source, and web speed), by way of the targeted introduction of gas or gas mixtures further controllable parameters (gas pressure, gas amount, gas composition, nozzle geometry) which enable targeted reduction of the hole size are available, and higher hole density may also be achieved by way of the enhanced positioning accuracy of the holes which is additionally enabled by plasma perforation.

The invention claimed is:

1. A method for manufacturing a diffusion-optimized mouthpiece lining paper for tobacco products, comprising:
    perforating a web of said mouthpiece lining paper by a perforation device which produces perforation holes in said web of said mouthpiece lining paper,
    determining diffusivity of said web of said mouthpiece lining paper from at least one parameter of said web that is metrologically acquired downstream of said perforation device, said at least one parameter being chosen from a group consisting of: a hole count of said perforation holes, a density of said perforation holes, and a hole size of said perforation holes,
    determining permeability of said web of said mouthpiece lining paper downstream of said perforation device, and
    minimizing the hole size of said perforation holes to maximize said diffusivity of said mouthpiece lining paper by regulating perforation parameters of said perforation device while constantly adhering said permeability of said mouthpiece lining paper to a pre-defined nominal permeability of said mouthpiece lining paper.

2. The method according to claim 1, further comprising predefining said pre-defined nominal permeability by pre-defining at least one of a degree of ventilation and a drag resistance to be achieved for said mouthpiece lining paper.

3. The method according to claim 1, further comprising measuring paper thickness of said web of said mouthpiece lining paper.

4. The method according to claim 1, further comprising controlling said perforation parameters of said perforation device such that a minimum hole diameter of said perforation holes is reached and said permeability is held constant by regulating a hole count of said perforation holes.

5. The method according to claim 4, further comprising determining said minimum hole diameter for said mouthpiece lining paper in an adjustment phase by automatic or manual variation of said perforation parameters of said perforation device.

6. The method according to claim 4, further comprising:
    acquiring metrologically hole diameters of said perforation holes, and
    determining the hole count of said perforation holes required to hold said permeability constant by calculation.

7. The method according to claim 1, wherein:
    said perforation device is a plasma perforation device, which directs energy impulses towards said web of said mouthpiece lining paper to produce plasma,
    the hole size of said perforation holes is minimized in that energy density of said plasma produced by said plasma perforation device is reduced so that between 50% to 80% of said energy impulses of said plasma perforation device perforate said web of said mouthpiece lining paper, and
    said perforation parameters of said plasma perforation device are subsequently controlled such that, on account of change in said energy density of said plasma, said hole count of said perforation holes or said density of said perforation holes, respectively, is obtained at which an actual value of said permeability of said mouthpiece lining paper is equal to said pre-defined nominal permeability of said mouthpiece lining paper.

8. The method according to claim 7, wherein regulating said hole size is established by one or a plurality of:
    modifying a gas pressure of said plasma perforation device;
    modifying a gas flow rate of said plasma perforation device;
    modifying a gas composition of said plasma perforation device;
    modifying a concentration of inert gas of said plasma perforation device;
    modifying an opening area of a nozzle of said plasma perforation device;
    modifying a distance by which a tip of said plasma perforation device projects from the nozzle of said plasma perforation device; and
    modifying a speed of said web of the mouthpiece lining paper.

9. The method according to claim 7, wherein regulating said number of said energy impulses of said plasma perforation device which perforate is performed by modifying at least one parameter selected from at least one of the following two groups of parameters:
    at least one of a frequency, a duration, and an amplitude of voltage impulse on electrodes of said plasma perforation device; and at least one of an output, a focal length, a frequency, a duration, and a geometry of light impulses of one or a plurality of laser beams of said plasma perforation device.

10. The method according to claim 1, wherein:
perforation is simultaneously performed by a plurality of perforating heads of said perforation device,
a hole diameter of each produced hole is determined, and
in a data processing system, each perforation head is assigned said hole diameter of said hole produced therewith.

11. The method according to claim 1, wherein:
said at least one parameter includes the parameter for the hole size; and
the minimizing of the hole size is performed by regulating a number of said perforation holes or a density of said perforation holes.

12. A method for manufacturing a diffusion-optimized mouthpiece lining paper for tobacco products, comprising:
perforating a web of said mouthpiece lining paper by a perforation device which produces perforation holes in said web of said mouthpiece lining paper,
determining diffusivity of said web of said mouthpiece lining paper from at least one parameter of said web that is metrologically acquired downstream of said perforation device, said at least one parameter includes a parameter for a hole size of said perforation holes, and
determining permeability of said web of said mouthpiece lining paper downstream of said perforation device, and
minimizing, with a first control loop, the hole size to maximize said diffusivity for carbon monoxide of said mouthpiece lining paper by regulating perforation parameters of said perforation device,
wherein with a second control loop said permeability of said mouthpiece lining paper is kept constant at a pre-defined nominal permeability of said mouthpiece lining paper by regulating the perforation parameters of said perforation device that are not influencing the hole size.

13. A method for manufacturing a mouthpiece lining paper for tobacco products, comprising:
perforating a web of the mouthpiece lining paper by a perforation device, the perforation device adapted to produce perforation holes in the web of the mouthpiece lining paper, the perforation holes having a hole size and a density;
determining a permeability of the web of the mouthpiece lining paper downstream of the perforation device; and
adjusting the perforating operation to minimize the hole size while maintaining the permeability of the mouthpiece lining paper at a pre-defined nominal permeability.

14. The method according to claim 13, further comprising predefining the pre-defined nominal permeability by determining at least one of a degree of ventilation and a drag resistance to be achieved for said mouthpiece lining paper.

15. The method according to claim 13, wherein the adjusting of the perforating operation comprises regulating the density of the perforation holes.

16. The method according to claim 15, wherein the adjusting of the perforating operation comprises determining a minimum hole diameter for the mouthpiece lining paper by automatic or manual variation of perforation parameters of the perforation device.

17. The method according to claim 15, further comprising:
acquiring metrologically hole diameters of the perforation holes; and
determining a hole count of the perforation holes required to hold constant the permeability.

18. The method according to claim 13, wherein:
the perforation device is a plasma perforation device, the plasma perforation device adapted to direct energy impulses towards the web of the mouthpiece lining paper to produce plasma;
the hole size of the perforation holes is minimized by reducing an energy density of the plasma so that between 50% and 80% of the energy impulses perforate the web of the mouthpiece lining paper, and
the perforation parameters of the plasma perforation device are controlled such that, on account of change in the energy density of the plasma, the hole count of the perforation holes or the density of the perforation holes, respectively, is obtained at which an actual value of the permeability of the mouthpiece lining paper is equal to the pre-defined nominal permeability of the mouthpiece lining paper.

19. The method according to claim 18, wherein regulating the hole size is established by one or a plurality of:
modifying a gas pressure of the plasma perforation device;
modifying a gas flow rate of the plasma perforation device;
modifying a gas composition of the plasma perforation device;
modifying a concentration of inert gas of the plasma perforation device;
modifying an opening area of a nozzle of the plasma perforation device;
modifying a distance by which a tip of the plasma perforation device projects from the nozzle of the plasma perforation device; and
modifying a speed of the web of the mouthpiece lining paper.

20. The method according to claim 18, wherein regulating the number of the energy impulses of the plasma perforation device which perforate is performed by modifying at least one parameter selected from at least one of the following two groups of parameters:
at least one of a frequency, a duration, and an amplitude of voltage impulse on electrodes of the plasma perforation device; and
at least one of an output, a focal length, a frequency, a duration, and a geometry of light impulses of one or a plurality of laser beams of the plasma perforation device.

* * * * *